United States Patent
Markhiani et al.

(10) Patent No.: US 11,995,454 B2
(45) Date of Patent: May 28, 2024

(54) DYNAMIC GENERATION AND CUSTOMIZATION OF USER INTERFACES

(71) Applicant: STRIPE, INC., South San Francisco, CA (US)

(72) Inventors: Hassaan Markhiani, Sugar Land, TX (US); Alex Parker LeBlanc, Eugene, OR (US); Colin Murray McLeod, Mercer Island, WA (US); John Iksoo Song, Irvine, CA (US); Jotham Mcclellan Taylor, III, Berkeley, CA (US); Daniel Garcia Diaz, Santa Maria, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 17/890,155

(22) Filed: Aug. 17, 2022

(65) Prior Publication Data

US 2024/0061687 A1 Feb. 22, 2024

(51) Int. Cl.
G06F 15/177 (2006.01)
G06F 8/38 (2018.01)
G06F 9/445 (2018.01)
H04L 67/306 (2022.01)

(52) U.S. Cl.
CPC .............. *G06F 9/4451* (2013.01); *G06F 8/38* (2013.01); *H04L 67/306* (2013.01)

(58) Field of Classification Search
CPC ......... G06F 9/4451; G06F 8/38; H04L 67/306
USPC ....................................................... 709/221
See application file for complete search history.

(56) References Cited

U.S. PATENT DOCUMENTS

| 11,137,887 | B1 | 10/2021 | Garibaldi et al. |
| 2015/0153918 | A1 | 6/2015 | Chen et al. |
| 2015/0160835 | A1* | 6/2015 | Singh ................... G06F 9/44526 715/734 |
| 2015/0339446 | A1 | 11/2015 | Sperling et al. |
| 2015/0370445 | A1* | 12/2015 | Wang ..................... G06F 16/986 715/765 |
| 2020/0081692 | A1* | 3/2020 | Multerer .................. G06F 8/38 |

(Continued)

OTHER PUBLICATIONS

International Search Report and Written Opinion for International Application No. PCT/US2023/030288, dated Nov. 21, 2023, 13 pages.

*Primary Examiner* — Alan S Chou
(74) *Attorney, Agent, or Firm* — Lewis Roca Rothgerber Christie LLP

(57) ABSTRACT

A method for generating a user interface includes: receiving a user request to access a software platform, the user request being associated with a user identifier; generating a user context based on the user request, the user context including a user profile associated with the user identifier; loading a data structure representing a user interface layout, the data structure including a plurality of viewport nodes, each of the viewport nodes being associated with one or more child nodes; selecting, by a computer system, a first child node from one or more child nodes of a first viewport node of the plurality of viewport nodes based on the user context to generate an evaluated data structure including a plurality of evaluated viewport nodes, each of the evaluated viewport nodes having at most one child node; and generating a customized user interface based on the evaluated data structure.

20 Claims, 12 Drawing Sheets

(56) References Cited

U.S. PATENT DOCUMENTS

| | | |
|---|---|---|
| 2020/0134001 A1 | 4/2020 | Kantamsetty et al. |
| 2020/0226418 A1* | 7/2020 | Dorai-Raj ............... G06F 17/18 |
| 2021/0124465 A1* | 4/2021 | Sahu ..................... G06F 3/0482 |
| 2023/0195826 A1* | 6/2023 | Marren .................. G06F 16/29 |
| | | 707/E17.112 |

* cited by examiner

DYNAMIC GENERATION AND CUSTOMIZATION OF USER INTERFACES

FIELD

Aspects of embodiments of the present disclosure relate to the dynamic generation and customization of user interfaces.

BACKGROUND

End users of software platforms interact with services built upon the software platforms through user interfaces generated by the providers of those software platforms.

For example, users of smartphones interact with services provided by the phone, such as voice calls, text messaging, web browsing, and functionality provided by specific applications or apps through a user interface provided by an operating system platform, such as icons and customizable widgets on a home screen.

In a similar manner, end users of online or web-based platforms, such as video streaming platforms, online office productivity suites (e.g., word processing, spreadsheet, and document collaboration tools), cloud-based financial service providers, and the like may also interact with the platforms and these services through interfaces implemented as dedicated applications or apps running on their end-user devices as well as through web-browser-based user interfaces.

Different end users may have different use cases for the various software platforms and therefore it is often beneficial when the user interfaces for these software platforms are customized or tailored to the needs of those particular users.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to systems and methods for decentralized and automatic configuration of user interfaces based on settings provided by end-users, application developers, and platform managers.

According to one embodiment of the present disclosure, a method for generating a user interface includes: receiving, by a computer system including a processing circuit and memory, a user request to access a software platform, the user request being associated with a user identifier; generating, by the computer system, a user context based on the user request, the user context including a user profile associated with the user identifier; loading, by the computer system, a data structure representing a user interface layout, the data structure including a plurality of viewport nodes, each of the viewport nodes being associated with one or more child nodes; selecting, by the computer system, a first child node from one or more child nodes of a first viewport node of the plurality of viewport nodes based on the user context to generate an evaluated data structure including a plurality of evaluated viewport nodes, each of the evaluated viewport nodes having at most one child node; and generating, by the computer system, a customized user interface based on the evaluated data structure.

The method may further include selecting, by the computer system, the user interface layout from a plurality of user interface layouts based on the user context.

The selecting the first child node based on the user context may be performed by a trained machine learning model.

The trained machine learning model may be a reinforcement learning model.

The one or more child nodes may be associated with one or more requirements, the selecting the first child node based on the user context may include: evaluating the one or more requirements based on the user context to compute one or more eligibility evaluations of the one or more child nodes of the first viewport node; and removing ineligible child nodes from the first viewport node to compute one or more eligible child nodes.

The selecting the first child node based on the user context may further include: computing one or more scores corresponding to the one or more eligible child nodes based on the user context; and computing a selected child node as the first child node based on the one or more scores.

The selecting the first child node based on the user context may further include: computing a selected child node as the first child node based the user context using a trained machine learning model associated with the one or more eligible child nodes.

The generating the customized user interface based on the evaluated data structure may include rendering the at most one child node of each of the evaluated viewport nodes of the evaluated data structure.

The rendering the at most one child node may include generating a hypertext markup language representation of the at most one child node of each of the one or more evaluated viewport nodes of the evaluated data structure.

The method may further include: detecting an error raised by a selected child node of the first viewport node; marking the selected child node as ineligible; and evaluating the first viewport node to select a child node other than the selected child node as the first child node.

According to one embodiment of the present disclosure, a system includes: a processing circuit; and memory storing instructions that, when executed by the processing circuit, cause the processing circuit to: receive a user request to access a software platform, the user request being associated with a user identifier; generate a user context based on the user request, the user context including a user profile associated with the user identifier; load a data structure representing a user interface layout, the data structure including a plurality of viewport nodes, each of the viewport nodes being associated with one or more child nodes; select a first child node from one or more child nodes of a first viewport node of the plurality of viewport nodes based on the user context to generate an evaluated data structure including a plurality of evaluated viewport nodes, each of the evaluated viewport nodes having at most one child node; and generate a customized user interface based on the evaluated data structure.

The memory may further store instructions that, when executed by the processing circuit, cause the processing circuit to select the user interface layout from a plurality of user interface layouts based on the user context.

The memory may further store instructions that, when executed by the processing circuit, cause the processing circuit to select the first child node based on the user context is performed by a trained machine learning model.

The trained machine learning model may be a reinforcement learning model.

The one or more child nodes may be associated with one or more requirements, the memory may further store instructions that, when executed by the processing circuit, cause the processing circuit to select the first child node based on the user context by: evaluating the one or more requirements based on the user context to compute one or more eligibility evaluations of the one or more child nodes of the first viewport node; and removing ineligible child nodes from the first viewport node to compute one or more eligible child nodes.

The memory may further store instructions that, when executed by the processing circuit, cause the processing circuit to select the first child node based on the user context by: computing one or more scores corresponding to the one or more eligible child nodes based on the user context; and computing a selected child node as the first child node based on the one or more scores.

The memory may further store instructions that, when executed by the processing circuit, cause the processing circuit to select the first child node based on the user context by: computing a selected child node as the first child node based the user context using a trained machine learning model associated with the one or more eligible child nodes.

The memory may further store instructions that, when executed by the processing circuit, cause the processing circuit to generate the customized user interface based on the evaluated data structure includes rendering the at most one child node of each of the evaluated viewport nodes of the evaluated data structure.

The memory may further store instructions that, when executed by the processing circuit, cause the processing circuit to render the at most one child node by generating a hypertext markup language representation of the at most one child node of each of the one or more evaluated viewport nodes of the evaluated data structure.

The memory may further store instructions that, when executed by the processing circuit, cause the processing circuit to: detect an error raised by a selected child node of the first viewport node; mark the selected child node as ineligible; and evaluate the first viewport node to select a child node other than the selected child node as the first child node.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
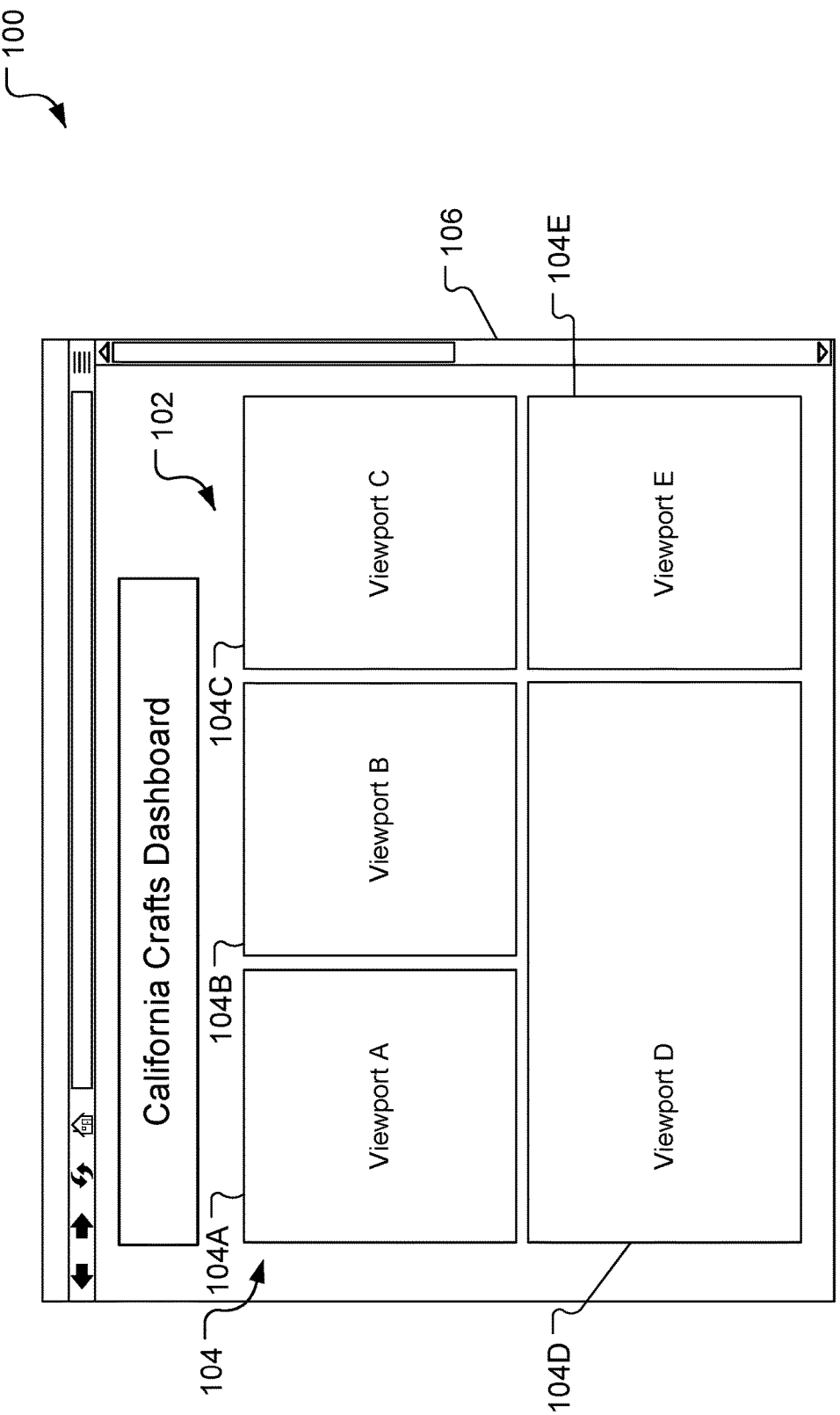
FIG. 1A is a depiction of a user interface having a grid layout to be configured according to one example of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present disclosure relate to systems and methods for decentralized and automatic configuration of user interfaces based on settings provided by end-users, application developers, and platform managers.

As discussed in the background section, user interfaces for software platforms and other software systems can be customized to suit the particular needs of different users.

For example, different users may or may not be permitted to access particular information or see particular user interface elements based on their roles. For example, users should not be able to access software modules or apps that they have not purchased, but may be shown promotions or advertisements for those apps (on the other hand, users who have purchased access to such apps may be shown those apps in the user interface and should not be shown advertisements to purchase those apps). As another example, users in one organization should not be able to see information belonging to another organization. As a further example, different users having different roles within an organization may have limited permissions to access particular types of information or may have different priorities (e.g., some information may be more relevant to some users than other users, and some information may always be irrelevant to particular users).

In addition, different applications or software modules running on the software platform may be relevant to different users at different times. For example, an operator of the software platform may want to promote particular services to all end-users of the software platform, or may want to target the promotion to particular end-users. As another example, end-users who are managers of an organization may want to provide some constraints and customize particular portions of the user interface to show particular software modules or widgets or widgets to all end-users who are members of the organization.

Different teams within the provider of the software platform may develop new software modules or apps that run on the software platform and that end-users can add to their user interfaces for the software platform. Furthermore, some software platforms allow third parties to develop new software modules or apps to run on the software platform and for users to bring those third party software modules into their customized user interfaces for interacting with the software platform.

As a result, there are many different factors from different parties or entities that can influence the appearance of a customizable user interface shown to an end-user, including constraints set by the first party provider of the software platform, apps or software modules provided by the first party provider, apps or software modules provided by third party software developers, customizations imposed by organizational users of the software platform, and restrictions and/or customizations set by end-users of the software platform.

In some software platforms, a human editor manually resolves some aspects of the potentially competing interests from multiple parties in order to explicitly manage the appearance of some portions of a user interface seen by an end-user, while allowing limited customization of other portions of the user interface based on user preferences.

However, as the number of end-users and corresponding roles increase, as the number of first-party and third-party developer software modules increases, and as the number of organizational users increases, manually managing and resolving problems in customized user interfaces for end-users becomes a combinatorically increasingly difficult problem.

Therefore, aspects of the present disclosure relate to a framework for automatically configuring a user interface for a particular end-user. For example, in some embodiments, a user context specifies information about the particular end-user (e.g., the end-user's role and/or permissions, the enabled apps or software modules for the end-user, the end-user's geographic location, etc.). To automatically generate a user interface for the end-user, a system loads a data structure representing a collection of multiple possible configurations of the user interface. For example, the data structure may specify a collection of slots or holes within the user interface, where each slot or hole is associated with a collection of options that can fill the slot in a final configuration of the user interface.

The data structure may then be evaluated based on the user context to generate a user interface configuration. For example, the evaluation of the data structure may include removing options (e.g., software modules) that the end-user is not eligible to use, and selecting from the remaining multiple eligible software modules based on a score or other selection criteria computed based on one or more of: the user context, parameters set by the developer of the software modules, parameters set by a manager of the organization that the end-user is a member of, and parameters set by the provider of the software platform. This also allows the user interface to automatically and dynamically evolve as new software modules are added to a library of available software modules, where the modules are dynamically shown only to eligible end-users and based on a calculated relevance to the user (e.g., through a machine learning model, through user profiling, or the like), and where explicit control by platform operators, managers, and end-users may be used to override the dynamic selection of software modules.

As a more concrete example, aspects of embodiments of the present disclosure will be described in the context of an end-user dashboard for monitoring and for accessing features of a business operations platform. However, aspects of embodiments of the present disclosure are not limited thereto, and a person having ordinary skill in the art will understand that the present technology may be used in the context of automatically generating user interfaces customized to particular end-users in other technological contexts.

FIG. 1A is a depiction of a user interface 100 having a grid layout 102 to be configured according to one example of the present disclosure. In particular, the example user interface 100 shown in FIG. 1A is a dashboard rendered by a web browser 106, where the user interface 100 includes a plurality of slots or viewports 104A, 104B, 104C, 104D, and 104E (collectively "viewport(s) 104") arranged in a grid layout 102 (e.g., arranged in a grid of three columns by two rows). Additional slots or viewports 104 may appear below the grid shown, such as by scrolling down through the view. As noted above, while some examples of the present disclosure are presented in the context of a user interface implemented by a web page rendered by a web browser, the present disclosure is not limited thereto. Particular slots or viewports 104 within a grid layout need not have the same width and height, so long as the widths and heights are a multiple of the grid dimensions. For example, viewports 104A, 104B, 104C, and 104E have the same 1 by 1 dimensions, but viewport 104D is two columns wide.

Figure 1B:
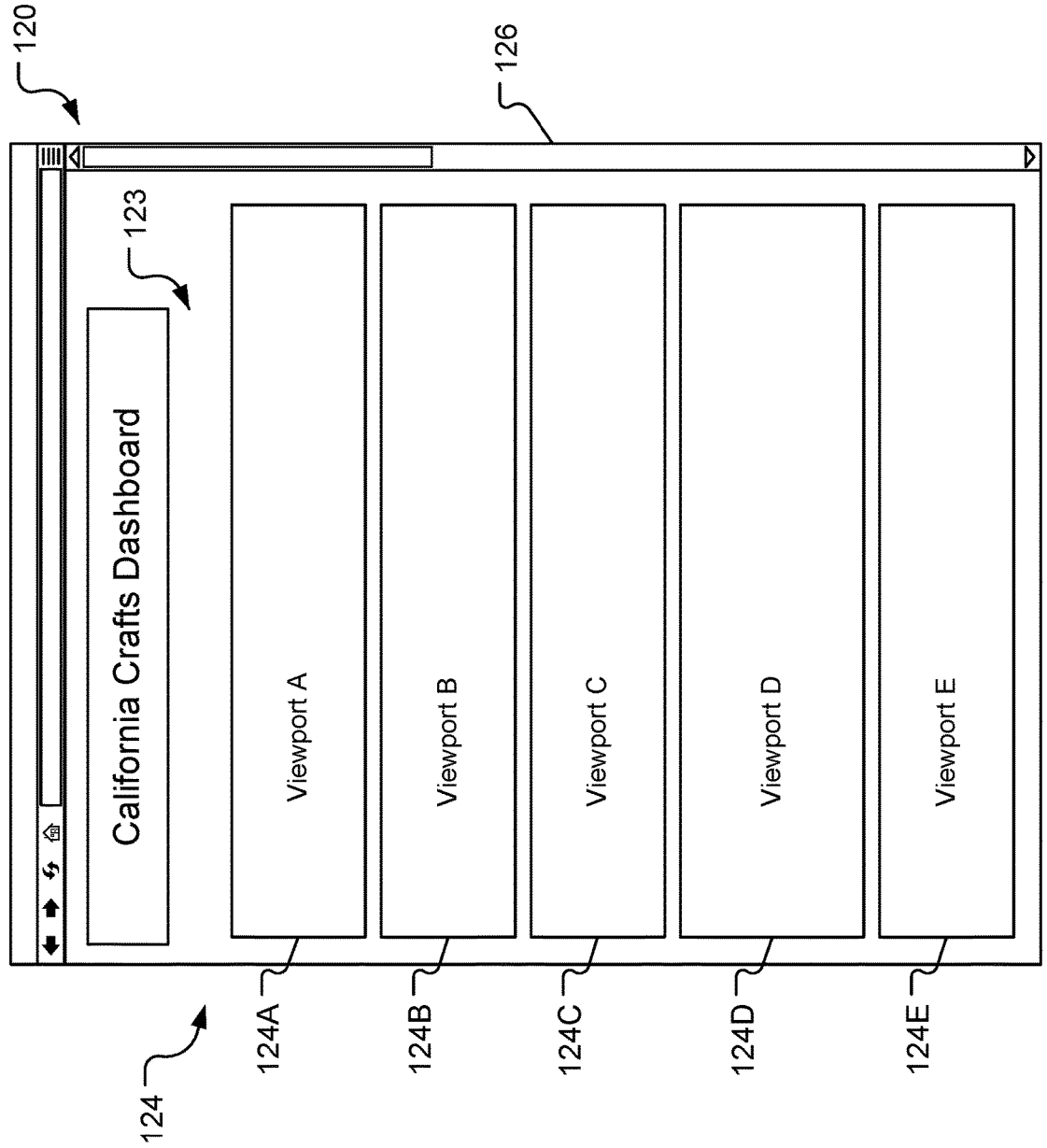
FIG. 1B is a depiction of a user interface having a row layout to be configured according to one example of the present disclosure.

FIG. 1B is a depiction of a user interface 120 having a row layout 123 to be configured according to one example of the present disclosure. The example shown in FIG. 1B is substantially similar to that of FIG. 1A, where a dashboard is rendered by a web browser 126 and the user interface 120 includes a plurality of slots or spaces or viewports 124A, 124B, 124C, 124D, and 124E (collectively "viewport(s) 124"), but where the viewports are arranged in a different layout, namely a row layout 123 instead of the grid layout 102 shown in FIG. 1A.

While FIG. 1A and FIG. 1B present two different examples of possible layouts, the present disclosure is not limited thereto and other layouts are possible, including layouts where different spaces or viewports have different sizes and or are arranged in non-uniform ways (e.g., a custom layout not based on a uniform grid or uniform list). One example of an alternative layout includes one or more columns, where viewports are stacked within a column and where individual viewports are permitted to automatically adjust in height according to the content displayed within a viewport, while being constrained by the width of the column. Another example of a layout has a particular fixed width for a column, where other columns may dynamically be allowed to be placed next to the fixed width column if there is sufficient space in the window, where the other columns are relocated to other places in the interface (e.g., placed below the fixed width column) when the overall space available for displaying the user interface 800 is not wide enough to show both the fixed width column and additional columns.

In addition, different layouts may be tailored to particular use cases or particular users. For example, a first layout may provide users with a high level overview of their business processes (the layout may further be tailored based on the user's role). A second layout may provide users with a detailed view of a particular business process, such as sales trends over various time periods. Another layout may be used to provide a user interface for setting user preferences with respect to the software platform 200.

As discussed above, different end-users of the software platform may have different priorities, different needs, and different access to available applications and/or features of the software platform accessed through a user interface such as the dashboards shown in FIG. 1A and FIG. 1B. Accordingly, these user interfaces can be customized by automatically selecting particular software modules that are relevant to the end-user and rendering user interface elements or app views corresponding to the selected software modules within the viewports available in the layout.

Figure 2:
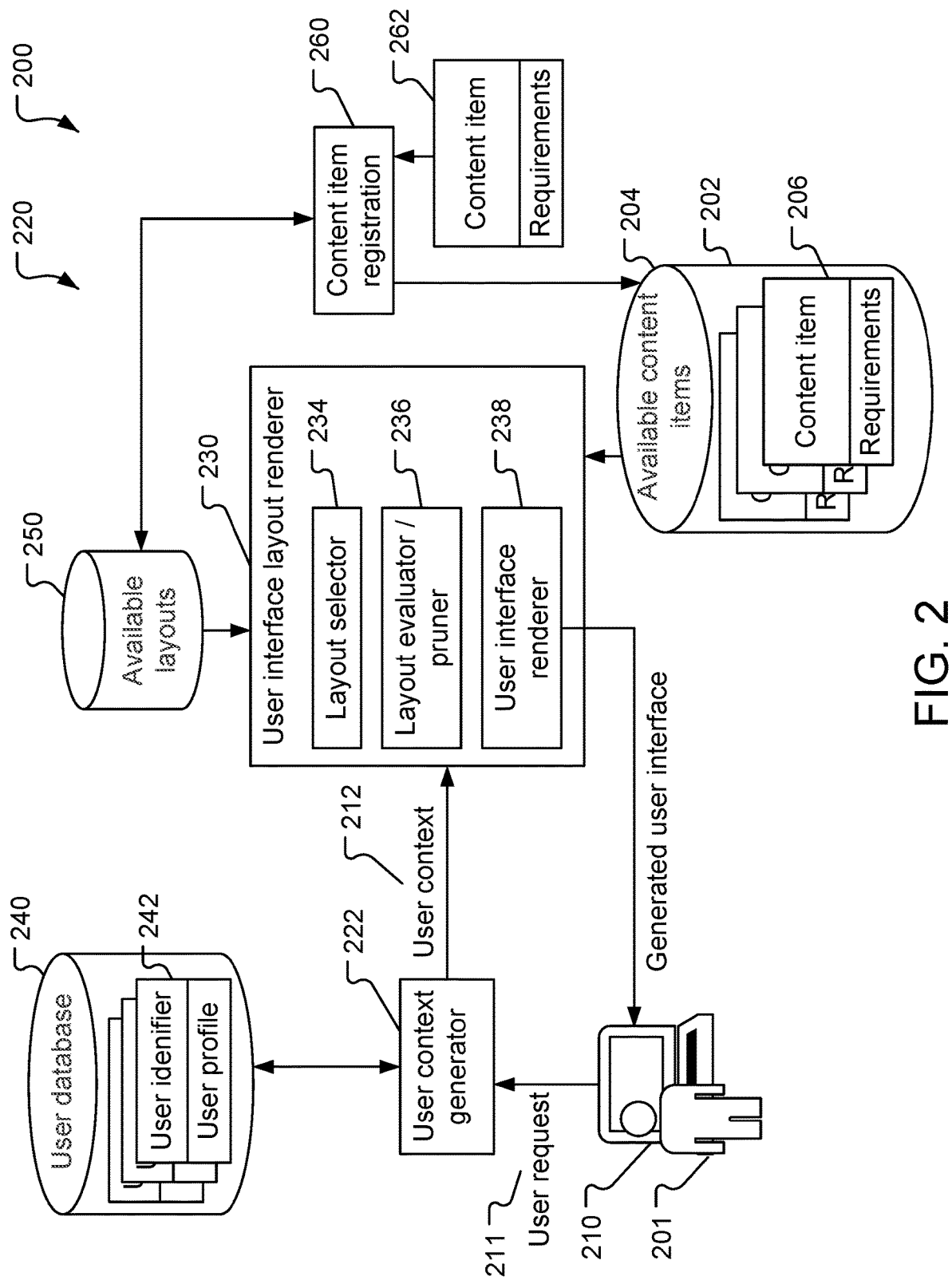
FIG. 2 is a system block diagram depicting a system for generating a user interface according to one example of the present disclosure.

FIG. 2 is a system block diagram depicting a software platform 200 for generating a user interface according to one example of the present disclosure. As shown in FIG. 2, an end user 201 interacts with a client computing device 210 such as a laptop computer, a smartphone, a tablet computer or the like. The client computing device 210 executes client application software for interacting with a software platform 220 to access functionality and services provided by the software platform 220. Some aspects of the software platform 220 relate to providing access to a database or other data store 202 that stores a library 204 of software modules 206 or content items, where the software modules 206 are represented as computer readable descriptions thereof. The computer readable descriptions of the software modules may include code or markup indicating how one or more views (or app views) of the software module 206 are to be rendered on a user interface shown on the client computing device 210.

Each software module 206 or content item may also be associated with a set of requirements or other constraints that specify whether or not the software module is eligible to be displayed to various users and a scoring function or other factor based analysis controlling the likelihood that a particular software module or content item will be shown to a user (e.g., based on whether the end-user matches the target audience for the content item).

The client application software may engage with the software platform 220 by submitting a user request 211 to the software platform 220. Continuing the example above, the incoming user request may be a hypertext transfer protocol (HTTP) request, where the client application software may be a web browser (or a web browser engine embedded within or integrated with another client application) executed by the client computing device 210. The software platform 220 according to some embodiments of the present disclosure includes a user interface layout renderer 230 that is configured to generate a user interface based on the user request and based on a user context 212 in accordance with the user request 211 and to return the generated user interface to the client computing device 210 such that the generated user interface is displayed on a display device or otherwise made available through the client computing device 210 (e.g., through screen reader software or other accessibility tools, through a virtual reality or augmented reality display device, or the like).

In more detail, in response to the user request, the user interface layout renderer 230 determines a collection of assignments of software modules (or content items) to slots or spaces or viewports within a layout (e.g., a grid layout such as that shown in FIG. 1A or a row layout such as that shown in FIG. 1B). In some embodiments, the user interface layout renderer 230 also determines which layout to use among a plurality of possible layouts.

As noted above, in various embodiments of the present disclosure, the various components of the software platform 220 are implemented by instructions stored in a non-volatile computer-readable memory and executed by one or more processing circuits of one or more computer systems, where the instructions configure the one or more processing circuits to be special purpose machines that perform the various operations according to the present disclosure.

For example, in some embodiments of the present disclosure, the software platform 220 is implemented by one or more computer systems each of which includes one or more processing circuits such as central processing units (CPUs), graphics processing units (GPUs), neural processing units (NPUs) along with volatile storage such as dynamic random access memory and non-volatile storage such as flash memory (NAND memory) and hard disk drives. The instructions associated with the software platform 220 may be executed directly on physical hardware or on virtual machines managed by a hypervisor. The instructions associated with the software platform may also be distributed across multiple computer systems (whether in a virtual machine or directly on the underlying hardware or "on the metal") and, in some embodiments, some or all components of the software platform 220 are executed by the client computing device 210.

Figure 3:
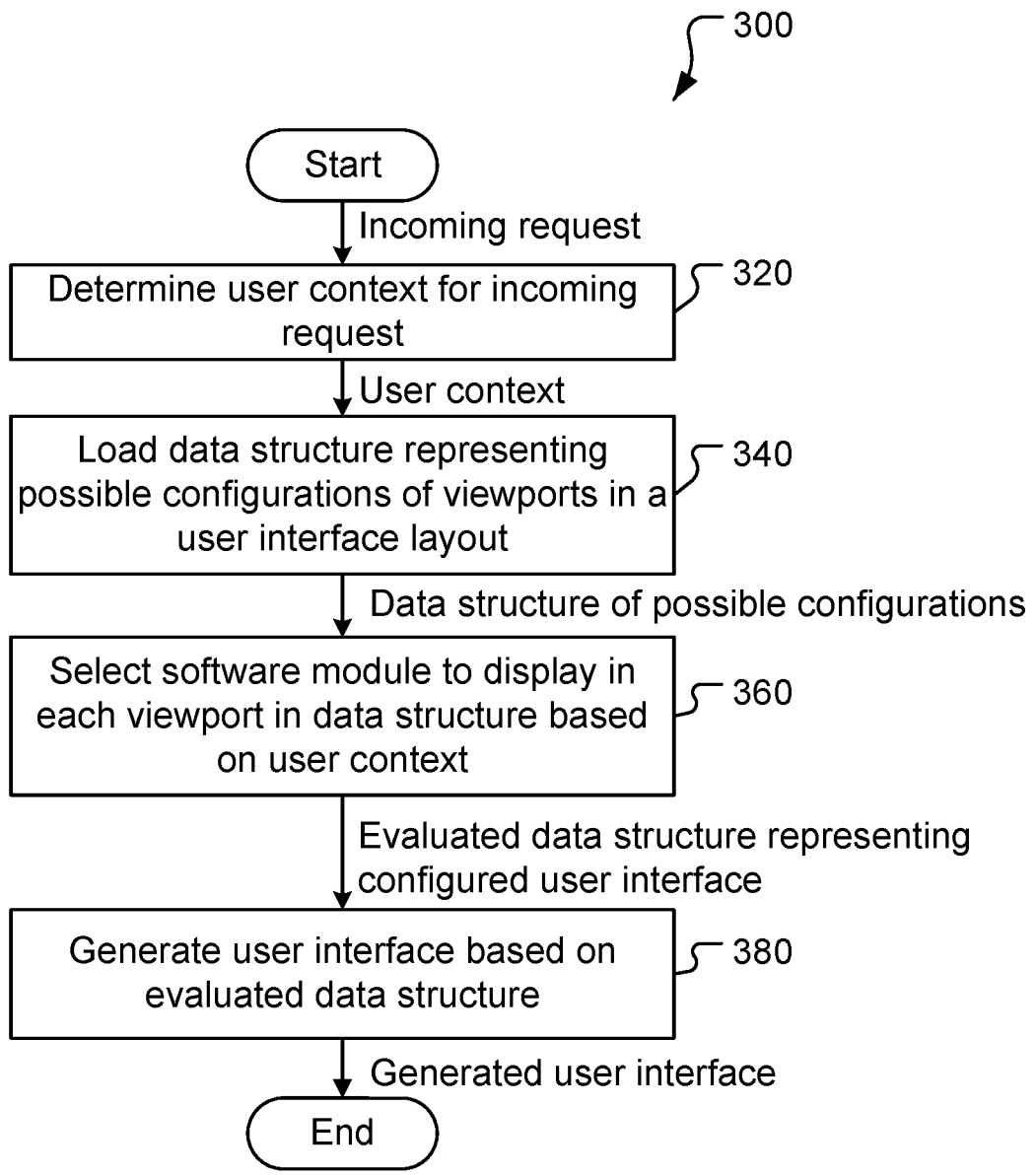
FIG. 3 is a flowchart depicting a method for configuring a user interface according to one example of the present disclosure.

FIG. 3 is a flowchart depicting a method 300 for configuring a user interface according to one example of the present disclosure. At operation 320, a user context generator 222 of the software platform 220 determines a user context 212 based on the user request 211. The user context 212 may be considered as including parameters for the user interface layout renderer 230 to personalize the user interface for the end-user, as described in more detail below.

In some examples, the user context 212 includes information about a known logged-in user associated with the incoming request. For example, in the case of a user interface provided through a web browser, the user request 211 may include a user identifier (e.g., stored in a user cookie) that identifies a user account registered on the software platform. Accordingly, the user context generator 222 may access one or more databases 240 to retrieve a user profile 242 associated with the user identifier.

The user profile 242 may include information such as: membership in particular groups (e.g., membership in a particular organization); roles associated with the user (e.g., "accounting," "sales," "engineering," "management," or combinations of these roles); and/or jurisdiction (e.g., city, county, state or province, country, tax status, etc.); and specific permissions associated with the user, their roles, their group memberships, and the like. The user profile 242 may further include information about previous or historical interactions between the user account associated with the user identifier and the software platform 220 (e.g., which app views the user previously interacted with). The user profile 242 may also include explicit preferences regarding the appearance of particular software modules in the user interface (e.g., specifying that a particular software module always appear or that a particular software module never appear).

The user context generator 222 may also load or generate additional information to be included in the user context 212, such as temporary or ephemeral information that relates to the particular user request 211 rather than being stable or permanent information stored in a user profile 242. For example, the temporary or ephemeral information may include the current network address (e.g., Internet Protocol address or IP address) of the client computing device 210, the current geographic location of the client computing device 210 (e.g., using geolocation information), the date and time of the user request 211, the type of client computing device being used (e.g., laptop versus desktop versus mobile device), and the like.

In a case where there are multiple possible layouts, a layout selector 234 of the user interface layout renderer 230 loads a data structure corresponding to a particular layout (e.g., a grid layout or a row layout) from a library of available layouts 250, and at operation 340, the user interface layout renderer 230 loads a data structure representing possible configurations of a user interface layout. In more detail, different layouts may be associated with different user interfaces corresponding to different functionality provided by the software platform, such as different dashboards targeting different use cases (e.g., different dashboards for engineering versus sales versus accounting), expanded detailed views of particular data on a service supported by the software platform 200 (e.g., specific dashboards regarding sales trends of different products over various time periods), data input user interfaces (e.g., for manually entering information or for generating custom reports), and the like. For example, the user request 211 and/or the user context 212 may specify a particular portion of the software platform 200 to be accessed by the client computing device 210.

Figure 4:
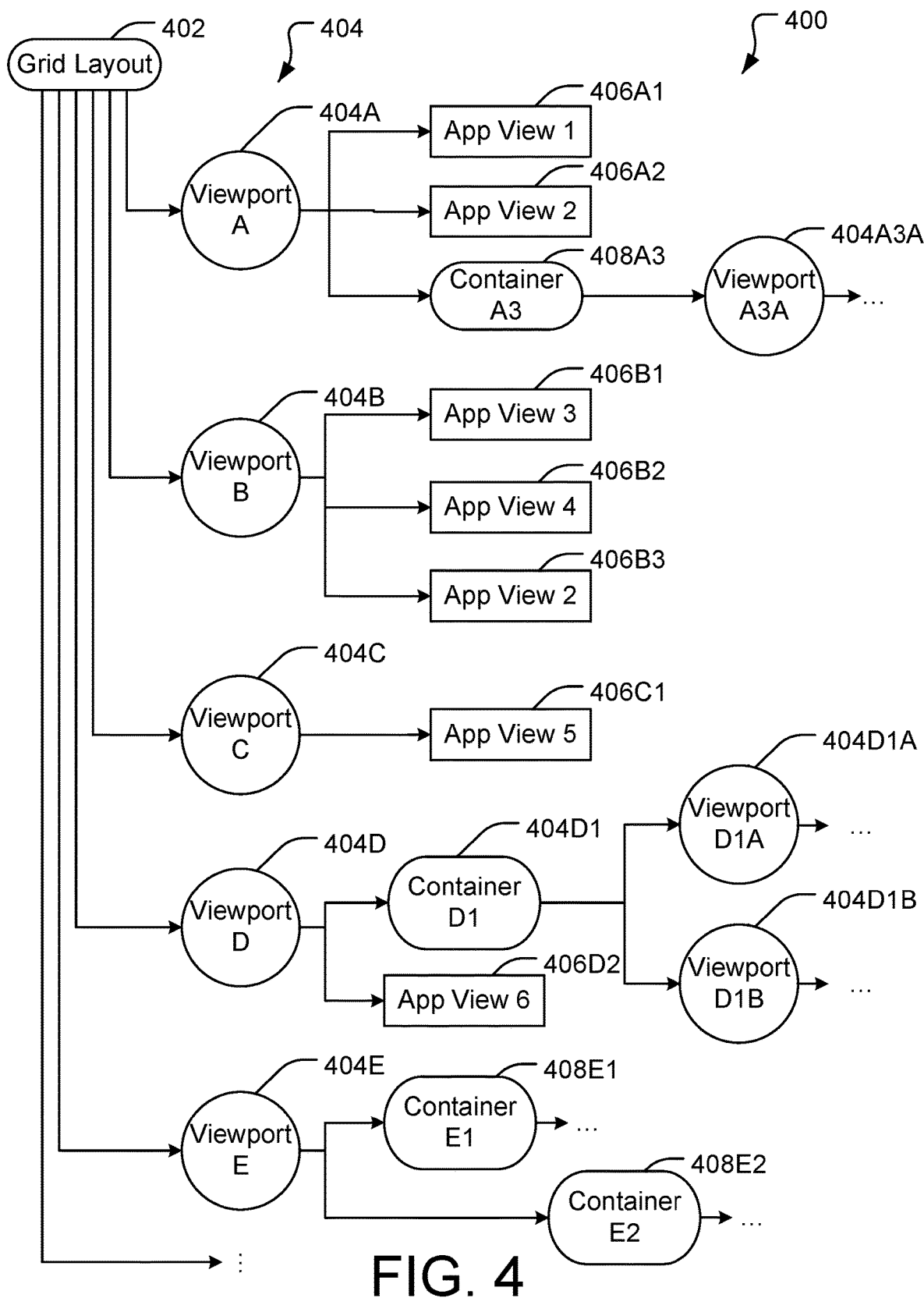
FIG. 4 is a schematic depiction of a tree data structure representing possible configurations of a user interface layout according to one embodiment of the present disclosure.

FIG. 4 is a schematic depiction of a data structure representing possible configurations of a user interface layout according to one embodiment of the present disclosure. In the particular example shown in FIG. 4, the data structure is a tree 400. In particular, the tree 400 representing possible configuration includes a root container 402 which represents the root of a set of possible configurations for a given layout (in FIG. 4, a "grid layout"). The root node 402 is connected to one or more viewport nodes 404, where each viewport node 404 in the tree 400 corresponds to a decision point for a particular viewport in the layout. For example, the viewport nodes 404 in FIG. 4 are labeled Viewport A, Viewport B, and so on to indicate that this tree 400 may be used to configure the viewports 104 of the grid layout 102 in the user interface shown in FIG. 1A, where, for example, viewport node 404A corresponding to Viewport A is used to configure the content of viewport A 104A in FIG. 1A.

Each viewport node 404 in the tree 400 shown in FIG. 4 includes one or more children (or child nodes), where these child nodes may include leaf nodes corresponding to particular app views nodes 406 (each app view corresponding to a particular software module, where the app view provides a user interface for interacting with an app or feature provided by the particular software module) and container nodes 408 containing one or more additional viewports 404, such a viewport may contain or include one or more sub-viewports.

As a specific example, a first viewport node 404A corresponding to Viewport A has three child nodes: a first app view node 406A1 (configured to display App View 1); a second app view node 406A2 (App View 2); and a container node 408A3 (Container A3). The container node 408A3, in turn, includes a viewport node (Viewport A3A) 404A3A which is connected to one or more child nodes (not shown). Viewport node 404A3A may be considered to be a sub-viewport node of viewport node 404A.

When evaluating the data structure representing possible configurations of a user interface based on the user context 212 (as described in more detail below with respect to operation 360) the user interface layout renderer 230 selects, for each viewport node 404, one of the child nodes of that viewport node 404 to be displayed in the corresponding viewport in the layout of the user interface.

While the first viewport node 404A provides an example of a viewport node that includes both app view nodes 406 and container nodes 408, the disclosure is not limited thereto.

For example, a second viewport node 404B, corresponding to Viewport B, includes three child nodes: a third app view node 406B1 (configured to display App View 3), a fourth app view node 406B2 (configured to display App View 4), and a fifth app view node 406B3 (configured to display App View 2). Accordingly, a viewport node may include only leaf nodes, without including container nodes. In addition, any particular app view may be eligible to be displayed in multiple viewports. For example, app view nodes corresponding to the same software module (as identified as App View 2) appear as child nodes to both the first viewport node 404A and the second viewport node 404B. During evaluation, as discussed in more detail below, particular software modules may provide information regarding whether they are to be included at most once or whether they can be included multiple times within a particular configuration of a user interface.

While the first viewport node 404A and the second viewport node 404B provide examples of viewport nodes that include multiple child nodes, embodiments of the present disclosure are not limited thereto. For example, a viewport node may have only a single child, such as a third viewport 404C corresponding to Viewport C has only one child node: an app view node 406C1 configured to display App View 5.

As noted above, container nodes may include multiple viewport nodes. For example, the root node 402 may be considered a container node that includes multiple viewport nodes. Similarly, a fourth viewport node 404D includes two child nodes: a container node 404D1 and an app view node 406D2. The container node 404D1, in turn, includes two viewports 404D1A and 404D1B, which, in turn, include their own child nodes (not shown) representing options for content to be shown in those two viewports. Accordingly, when evaluating the data structure based on the user context, Viewport D may be populated by either a container that includes two sub-viewports (and their own corresponding content) or App View 6.

In addition, a viewport node may include multiple different container nodes among the options for populating the node. For example, fifth viewport node 404E includes two container nodes 408E1 and 408E2, each of which is connected to or includes or one or more child nodes (e.g., app view nodes and/or container nodes).

At operation 360, a layout evaluator or layout pruner 236 of the user interface layout renderer 230 selects a software module to display in each viewport in the data structure, based on the user context 212. In some circumstances, the layout evaluator or layout pruner may be referred to as an experience engine, where the experience engine customizes the user experience of the layout based on the user context 212. In a case where the data structure is a tree, this may be viewed as pruning the tree to remove the child nodes that are not selected through the evaluation process such that only the selected child nodes remain. (In some embodiments, the evaluation or pruning is performed on a breadth-first basis, by first evaluating the shallower nodes in the tree data structure before evaluating deeper nodes, such that viewport nodes that are pruned away are not evaluated. In some embodiments, the evaluation or pruning is performed on a depth-first basis, where parent viewport nodes are evaluated during the depth-first traversal, such that only selected child nodes are evaluated and viewport nodes that are pruned away are not evaluated.)

In more detail, each child node associated with a viewport is associated with one or more constraints or requirements that are evaluated based on the user context 212. The constraints or requirements of each child node may also be evaluated based on portions of the data structure that have been previously evaluated.

While the above description presents example embodiments where a viewport node can have an app view node or a container node as a child, embodiments of the present disclosure are not limited thereto. In some example embodiments, a viewport node can only have an app view node as a child (and not a container node), and the app view node may have a container node as its child.

Figure 5:
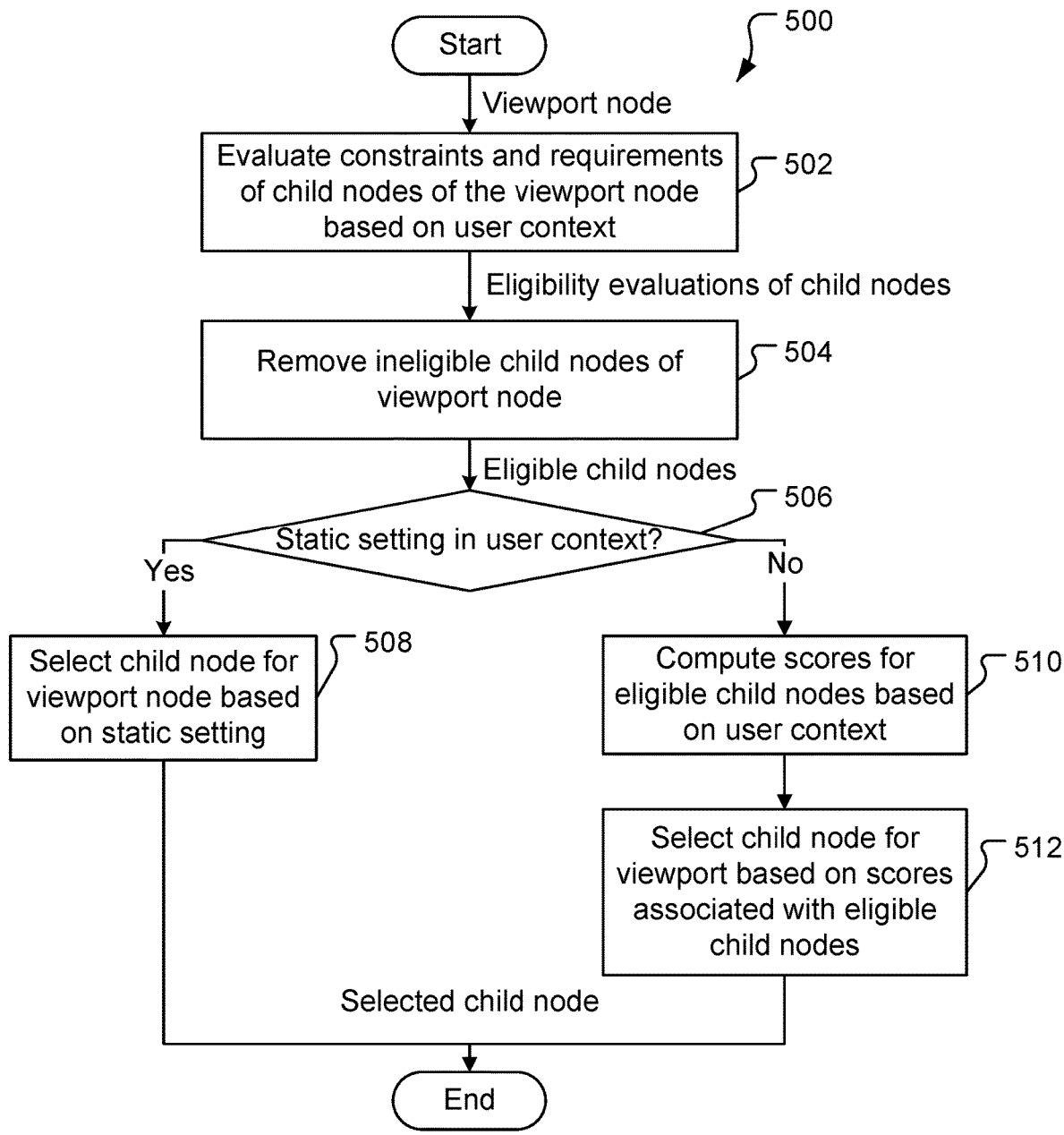
FIG. 5 is a flowchart of a method for selecting from a plurality of options for a viewport of a user interface by evaluating a viewport node based on user context according to one embodiment of the present disclosure.

FIG. 5 is a flowchart of a method 500 for selecting from a plurality of options for a viewport 104 of a user interface by evaluating a viewport node 404 based on user context 212 according to one embodiment of the present disclosure. In some embodiments, the method 500 is implemented by the layout evaluator or layout pruner 236 of the user interface layout renderer 230. Initially, method 500 begins with a currently selected viewport node 404 to be evaluated, where the viewport node 404 includes one or more child nodes. After completing evaluation of the viewport node 404, the viewport node 404 is left with, at most, one child node corresponding to the selected option.

As noted above, each child node is associated with one or more constraints or requirements. At operation 502, the user interface layout renderer 230 evaluates these constraints or requirements based on the user context 212. For example, some app views may be visible only to users who are members of particular user groups. As another example, some app views may be configured such that they only appear once in a user interface, such that if the app view has already been selected for another viewport, then that app view is not eligible to be displayed in the current viewport (e.g., referring to FIG. 4, if the first viewport node 404A corresponding to Viewport A has been evaluated to selected app view node 406A2 corresponding to App View 2, and App View 2 has a requirement that it appear at most once in a layout, then child node 406B3 corresponding to another instance of App View 2 is removed at operation 504. (On the other hand, if child node 406A1 corresponding to App View 1 was selected for the first viewport 404A, then child node 406B3 corresponding to App View 2 would remain eligible.)

As a specific example, an app view showing live revenue information may be available only to end-users who are in the management and accounting user groups, and not available to end-users who are not in those user groups (e.g., support and engineering).

As another example, a promotional app view (e.g., advertisement) should be shown only to users who are not already using the promoted product (should not be shown to users who are already subscribed to the product). As a more specific example, an app view promoting a new feature supported by the software platform relating to multi-state United States sales tax compliance may include requirements that the app view be shown only to end-users who: are not yet using the new feature; are in an accounting or compliance role, make taxable sales in multiple jurisdictions in the United States; and are subject to other requirements (e.g., minimum total revenue requirements) to be subject to regulations to comply with multi-state sales tax.

Accordingly, in some examples of the present disclosure, child nodes are associated with a set of requirements, where the requirements may be expressed as a Boolean expression that is evaluated by setting the variables within the Boolean expression based on values in the user context (e.g., where the user context includes, for example, user group membership information, user organization information, geographic location, sales information, and revenue information in the above examples regarding access to a live revenue information app view and a multi-state sales tax compliance promotional app view).

At operation 504, the user interface layout renderer 230 removes any ineligible child nodes from the viewport node, as determined based on the evaluation of the constraints and requirements in view of the user context 212.

At operation 506, the user interface layout renderer 230 determines whether there are any static settings set by the user context 212, where the static setting specifies a particular child node of the remaining available child nodes (e.g., among the child nodes removed at operation 504) to be selected. If so, then at operation 508 the user interface layout renderer 230 selects the particular child node specified by the static settings and proceeds with configuring the selected child node, as needed (e.g., if the selected child node points to a container node or another viewport node, then evaluating any sub-viewport nodes to select child nodes of those sub-viewports).

The static setting may be set by, for example, an end-user, an organization that the user is a member of (e.g., the user's employer), or the provider of the software platform, where the setting may be specified in the user context 212 (e.g., stored in a profile associated with the user identifier, in a group profile associated with a group that the user identifier is a member of, or in a software platform-wide or global profile that is applied to all users of the software platform).

If there is no static setting for the viewport node in the user context 212, then the user interface layout renderer 230 selects a child node from among the remaining eligible child nodes (e.g., the child nodes that were not removed by the filtering based on permissions and requirements at operation 504).

In some embodiments of the present disclosure, at operation 510, the user interface layout renderer 230 computes a score for each of the remaining child nodes based on the user context.

In some embodiments, the score is calculated explicitly for each of the remaining child nodes based on a scoring function associated with the child node. A particular child node includes a scoring function whose arguments or input parameters correspond to one or more properties that may appear in a user context 212. For example, in some embodiments, the scoring function has the form of a weighted sum of factors, where each factor corresponds to a user attribute or a combination of user attributes.

Referring back to the example above regarding an app view to display a promotion of a multi-state sales tax compliance feature, the factors may include whether the end-user is a manager (e.g., because a manager is more likely to be authorized to subscribe to the feature), whether the volume of sales made to different sales tax jurisdictions (e.g., if the vast majority of sales are to jurisdictions with no sales tax requirements then an end-user may be less likely to be interested), the rate of change of sales to jurisdictions that require sales tax compliance (e.g., even if an end-user or their organization is not yet selling many goods to taxable jurisdictions, the trend may be increasing), and the types of goods being sold (e.g., what percentage or revenue volume of the goods being sold are subject to sales tax).

At operation 512, the user interface layout renderer 230 selects a child node among the eligible child nodes based on the scores computed for those eligible child nodes at 510. For example, a child node having a high score among the computed scores is selected as the child node to be shown in the viewport.

In some embodiments, the score is computed using a trained machine learning model, such as a neural network, that takes features (e.g., numerical values) extracted from the properties or parameters in the user context 212 and the factors extracted from the eligible child nodes.

In some embodiments, instead of computing scores for the eligible child nodes and selecting a child node based on the computed scores, a child node is selected directly from among the options by a reinforcement learning (RL) machine learning model such as a trained multi-armed bandit machine learning model.

In more detail, in some examples, a separate RL machine learning model is trained and maintained for each distinct set of eligible child nodes (and, in some embodiments, separate RL machine learning models for particular viewports within a layout), where each separate RL machine learning model maintains and updates weights associated with corresponding ones of the eligible child nodes, and where the machine learning model selects a selected child node from among the eligible child nodes probabilistically (e.g., randomly) in accordance with the weights (e.g., has a higher probability of selecting a child node with a higher weight than another node having a lower weight).

In some embodiments, the RL machine learning model is trained based on user interaction data, such as click through rate (CTR) on various child nodes that are displayed to users in other circumstances where the user interface layout renderer 230 selects from the same set of eligible child nodes, where a higher click through rate on a particular corresponding app view is treated as a reward that causes the weight associated with the child node to be increased and a lower click through rate on an app view is treated as a penalty causes the weight associated with the corresponding child node to be decreased. In some embodiments, other indicators or user interaction may be used to train the RL model instead of, or in addition to, CTR. These other indicators may include hover time (e.g., time in which a user's mouse cursor hovers over an app view), interaction with an app view (e.g., interactions that result in an exploration of data presented in the app view without requiring a click, such as showing particular data values associated with data points under a cursor), visibility of an app view in a dashboard (e.g., whether the particular app view is visible within a browser window or hidden from view because it is scrolled to be off screen), and lifetime value (e.g., lifetime revenue for the software platform through interaction with the app view). In some embodiments, the user settings provide explicit feedback that is used to train the RL model. As a result, app views that are popular or frequently interacted with will be selected by the machine learning model more frequently than unpopular child nodes.

In some embodiments of the present disclosure, scores are computed as above, and a machine learning model such as a multi-armed bandit model is used to break a tie in the case where two or more child nodes are given a same score.

Accordingly, by applying the child node selection process to each viewport node in the data structure (e.g., in the tree 400) based on the user context 212, the data structure is evaluated or pruned such that each viewport has only a single direct child node, where the single child node of each viewport represents the content (e.g., app view or container of one or more viewports with corresponding app views) that will be displayed in that viewport.

At operation 380, a user interface renderer 238 of the user interface layout renderer 230 generates a user interface based on the evaluated data structure representing a layout configured at operation 360 based on the user context. The particular technique for generating the user interface will depend on the particular software technology, such as based on a particular application programming interface (API) that controls an underlying user interface framework for delivering the user interface to a client device of the end-user. As one example, in the case of a web browser-based user interface, the user interface layout renderer 230 generates a web page or a portion of a web page, as expressed using hypertext markup language (HTML), extensible hypertext markup language (XHTML), or, in the case of client-side rendered web pages, in a data format such as extensible markup language (XML) or JavaScript Object Notation (JSON). In more detail, each selected software module provides a function or other mechanism for generating a portion of the webpage corresponding to its individual app view or user interface, to be contained within a viewport. Accordingly, the user interface layout renderer 230 generates the user interface at operation 380 by calling the rendering function associated with each node in the evaluated data structure.

In some circumstances, after selecting a particular child node for a viewport node (e.g., an app view), the content of the child node may raise an error. An error may arise due to, for example, a problem in the underlying code to render an app view (e.g., detection of an incompatibility between multiple different app views in the evaluated data structure, an error raised while executing the code to render the interface associated with the selected app view (e.g., an error in the rendering code), an outage in a back-end service providing data to a particular app view, or the like. In some embodiments, in the case of an error, a viewport node associated with the failing app view is re-evaluated to select a fallback child node from among the eligible child nodes. For example, the failing child node may be marked as ineligible or removed at operation 504 of method 500 and another child node is then selected from the remaining eligible child nodes.

Embodiments of the present disclosure are not limited to web based technologies and the user interface layout renderer 230 may be implemented to dynamically generate user interfaces in other contexts, whether remote from the client computing device 210 or local within the client computing device 210. For example, the user interface layout renderer 230 may generate a description of a user interface in a data format such as extensible markup language (XML) or JavaScript Object Notation (JSON) that is provided to an application or app running on the client computing device 210, where the client device renders a user interface specified by the description by loading appropriate content items, whether within a client-side web browser-based application or in a view implemented within a standalone application or app running on the client computing device 210.

As discussed above, each child node is associated with a viewport, where each child node also has one or more constraints or requirements that are evaluated based on the user context 212. In the case of duplicated nodes (e.g., child node 406A2 and child node 406B3 corresponding to the same software module rendered to App View 2, the one or more constraints or requirements may be the same). In more detail, the constraints or requirements are specified by the developer of the corresponding software module, such as a third party software developer who created the software module to run on the software platform or a first party software developer associated with the software platform. Likewise, the developer of the software module specifies the scoring function that is used to compute a score for the child node based on the user context 212. In addition, the developer of the software module specifies which viewports within a layout are targeted by the software module (e.g., which viewport nodes will include the software module as a child node) and also specifies how the user interface for the software module will be rendered within a corresponding view port to generate the app view for the software module.

Accordingly, the specification of which portions of a layout of a user interface display app views corresponding to particular software modules and the conditions under which those app views are displayed is decentralized and distributed amongst the developers of the software modules. This arrangement may be particularly beneficial in circumstances where the developers of the separate software modules may have a better understanding of the target end-users or target audience for those software modules than a centralized authority (e.g., a human editor or manager of the user interface layout).

Developers of software modules for the software platform may register their software modules in a library 204 of available software modules or available content items, where the software modules or available content items target particular viewports of various user interface layouts. In some embodiments, a software module or content item registration service 260 handles the registration or update of software modules or content items into the library of available content items and updates the available layouts accordingly.

Figure 6:
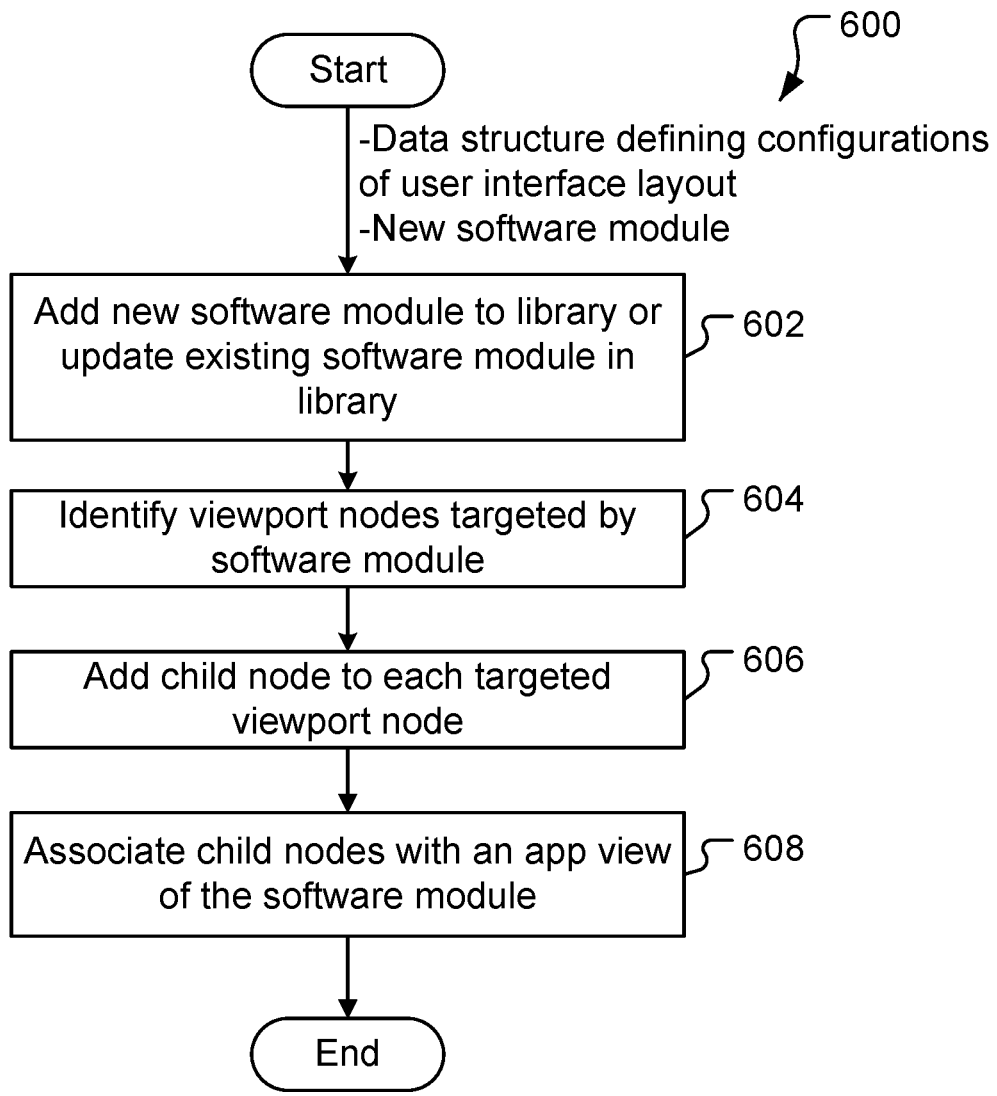
FIG. 6 is a flowchart of a method for adding a software module to a data structure representing possible configurations of a user interface layout according to one example of the present disclosure.

FIG. 6 is a flowchart of a method 600 for adding a software module or content item 262 to a data structure representing possible configurations of a user interface layout according to one example of the present disclosure. For example, the technique described with respect to FIG. 6 may be used to generate a tree 400 data structure shown in FIG. 4.

In more detail, a data structure for a particular user interface layout may initially be specified (e.g., by a developer of the software platform) as including a plurality of viewport nodes corresponding to the viewports of the user interface layout (e.g., a grid layout, a row layout, or other arrangement of viewports in a display).

When a new software module 262 is provided to the software platform 220, at operation 602, a software module or content item registration process 260 adds the newly registered software module 262 to the library 204 of available content items (or replaces or modifies an existing registered software module with a newly updated version) and, at operation 604, identifies all targeted viewport nodes in one or more user interface layouts, where the target viewport nodes are specified by the software module. At operation 606, the software module or content item registration process 260 adds a new child node to each targeted viewport node in the corresponding layouts, and at operation 608, the software module or content item registration process 260 associates the child node with an app view of the software module (e.g., a single software module may have multiple app views, which may relate to different possible views of data provided by the software module). In some embodiments, the software module or content item registration process 260 determines whether the targeted viewport node already includes a child node corresponding to the app view of the software module and, if so, refrains from adding a duplicate child node (this may be beneficial in the case of updating a software module, in which case a data structure representing possible configurations of the user interface may be updated to add or remove child nodes based on changes to which viewports are targeted by the updated software module).

Figure 7:
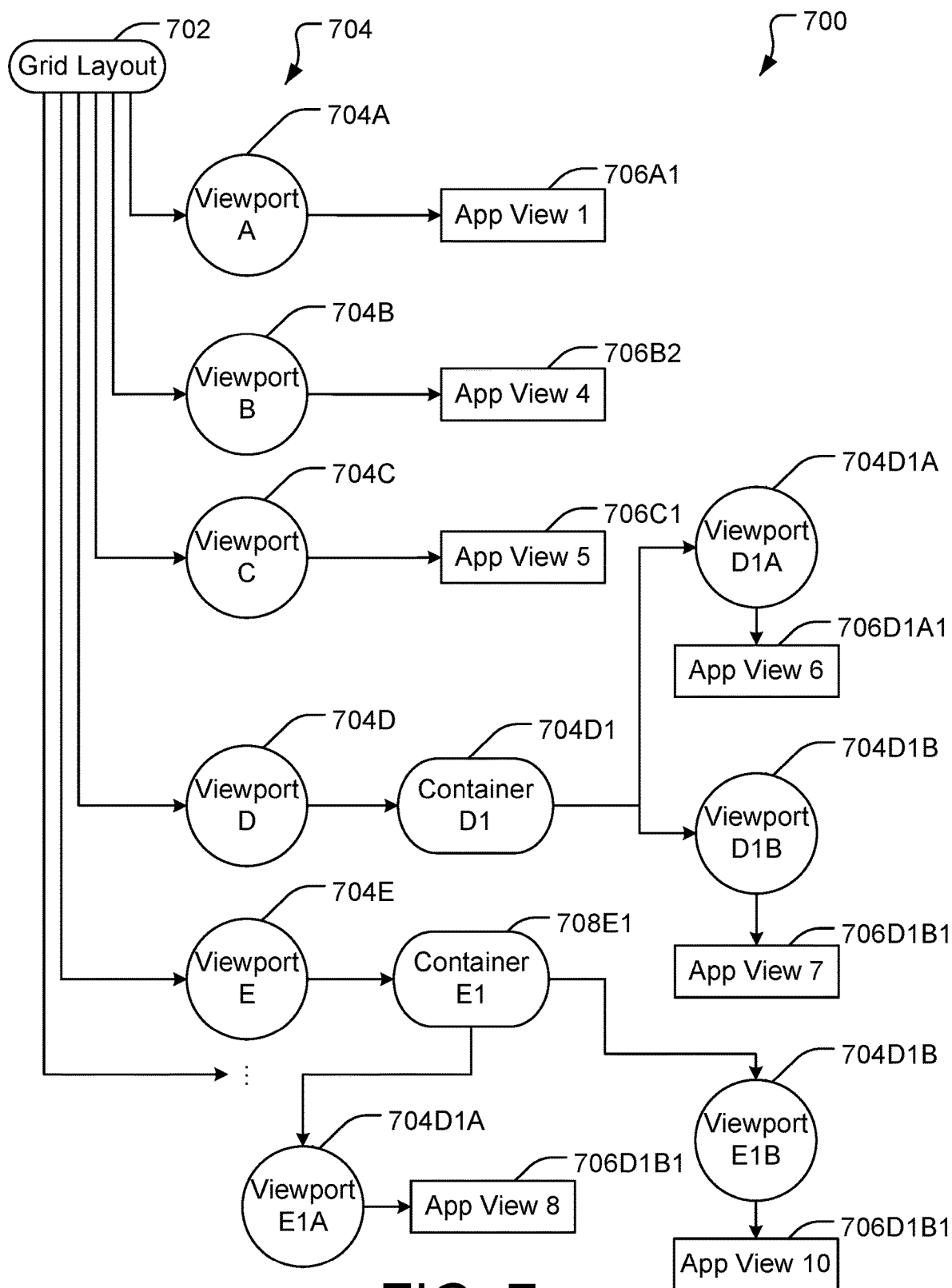
FIG. 7 is an example of an evaluated data structure or pruned data structure based on a user context in accordance with a method of the present disclosure to specify a user interface customized for the end-user associated with the user context.

FIG. 7 is an example of an evaluated data structure or pruned data structure based on a user context in accordance with a method of the present disclosure to specify a user interface customized for the end-user associated with the user context. The particular example evaluated data structure or pruned data structure 700 shown in FIG. 7 corresponds to an evaluated or pruned version of the tree data structure 400 shown in FIG. 4, where child nodes of various viewport nodes 704 have been pruned away such that each viewport node 704 has only one child node. The evaluation process or pruning process may be performed in a manner as described above with resect to FIG. 5. For example, the evaluation process removed the child nodes 406A2 and corresponding to App View 2 and the child node 408A3 corresponding to Container A3 from the first viewport node 404A, such that the evaluate or pruned version of the first viewport node 704A has only a single child node 706A1 corresponding to App View 1. Likewise, child nodes 706B1 and 706B3 are pruned away during the evaluation of second viewport node 704B to leave only child node 706B2 corresponding to App View 4 as the only child node of second viewport node 704B. While the above description presents an example embodiment where a viewport node can have an app view node or a container node as a child, embodiments of the present disclosure are not limited thereto. In some example embodiments, a viewport node can only have an app view node as a child (and not a container node), and the app view node may have a container node as its child.

Figure 8:
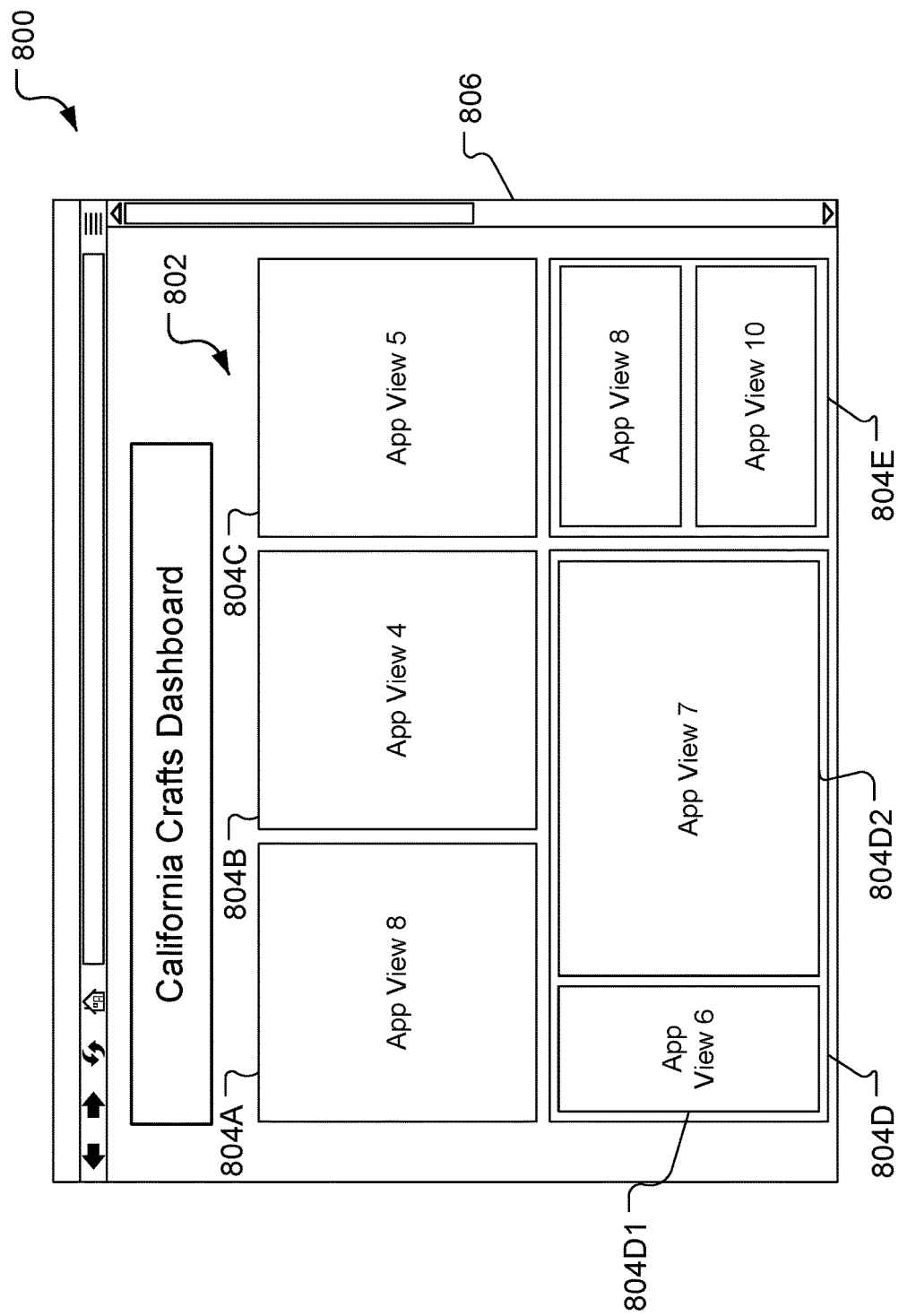
FIG. 8 is an example of a user interface 800 generated in accordance with the evaluation of the data structure shown in FIG. 7.

FIG. 8 is an example of a user interface 800 generated by the user interface renderer 238 in accordance with the evaluation of the data structure shown in FIG. 7. In the particular example shown in FIG. 8, the user interface 800 follows the grid layout 802 corresponding to that shown in FIG. 1A, where various viewports are arranged in a grid that includes three columns and two rows. In contrast to the example shown in FIG. 1A, the individual viewports are populated with corresponding app views, where the app view (or, in some cases, multiple app views) selected to be shown in each viewport 804 is selected based on an evaluation or pruning of a data structure (e.g., a tree data structure 400 as shown in FIG. 4, evaluated in accordance with a method as shown in FIG. 5) to compute an evaluated data structure (e.g., as shown in FIG. 7). In more detail, a first viewport 804A is populated with App View 1, a second viewport 804B is populated with App View 4, and a third viewport 804C is populated with App View 5, which matches single child nodes 706A1, 706B2 and 706C1 of respective viewport nodes 704A, 704B, and 704C as shown in FIG. 7. In the embodiment shown in FIG. 8, the user interface 800 is displayed within a web browser 806.

In addition, as shown in FIG. 7, the fourth viewport node 704D has a container D1 704D1 as its sole child, where the container D1 704D1 has two viewport nodes as children: viewport node D1A 704D1A and viewport node D1B 704D1B, which were evaluated to have respective app view child nodes 706D1A1 and 706D1B1 that display App View 6 and App View 7. Because these two viewports are contained in a parent viewport D 704D, the two app views are shown in FIG. 8 as sub-viewports 804D1 and 804D2 within a fourth viewport 804D.

Accordingly, aspects of embodiments of the present disclosure provide systems and methods for decentralized and automatic configuration of user interfaces based on settings provided by end-users, application developers, and platform managers. In particular, developers of applications or software modules specify requirements and other parameters for targeting software modules particular types of users and placing user interface elements (app views) at particular locations within user interface layouts. End-users and platform managers may specify particular settings for user interface elements (app views) to appear at particular locations within the user interfaces. Accordingly, embodiments of the present disclosure enable customized and tailored user interfaces to be automatically generated for users, even as new content items or software modules are added to the system, without requiring manual intervention by end-users or human editors (e.g., managers of the software platform) to specify the inclusion of particular software modules (app views) within a user interface, while still allowing the end-users and platform managers to retain control and to reserve locations in the user interfaces for particular purposes (e.g., special announcements and temporary modifications to user interfaces).

For example, a platform operator may wish to temporarily generate a notice that is shown to all end-users (e.g., an announcement of upcoming changes to the platform and/or migration procedures). In such a case, an existing layout may be modified to add an additional viewport node containing an app view to make the desired announcement, where the additional viewport corresponding to the node appears at the top of the user interface (e.g., as a full-width banner above the grid layout shown in FIG. 1A).

Figure 9:
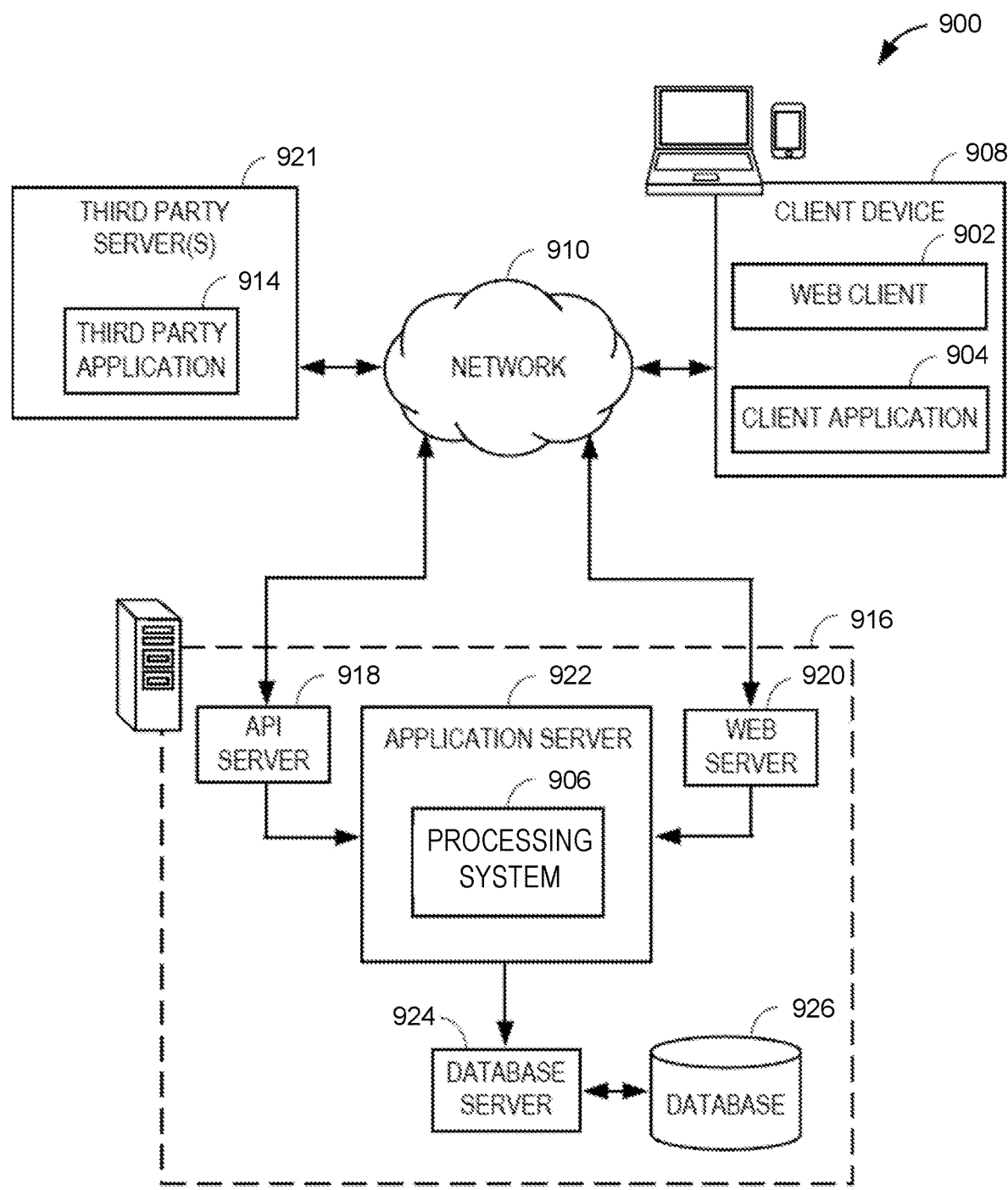
FIG. 9 is a block diagram illustrating a high-level network architecture of a computing system environment for operating a processing system according to embodiments of the present disclosure.

With reference to FIG. 9, an example embodiment of a high-level SaaS network architecture 900 is shown. A networked system 916 provides server-side functionality via a network 910 (e.g., the Internet or a WAN) to a client device 908. A web client and a programmatic client, in the example form of a client application, are hosted and execute on the client computing device 210 (labeled 908 in FIG. 9). The networked system 916 includes one or more servers 922 (e.g., servers hosting services exposing remote procedure call APIs), which hosts a processing system 906 (such as the software platform 200 described above according to various embodiments of the present disclosure) that provides a number of functions and services via a service oriented architecture (SOA) and that exposing services to the client application 904 that accesses the networked system 916 where the services may correspond to particular workflows. The client application 904 also provides a number of interfaces described herein, which can present an output in accordance with the methods described herein to a user of the client device 908.

The client device 908 enables a user to access and interact with the networked system 916 and, ultimately, the processing system 906. For instance, the user provides input (e.g., touch screen input or alphanumeric input) to the client device 908, and the input is communicated to the networked system 916 via the network 910. In this instance, the networked system 916, in response to receiving the input from the user, communicates information back to the client device 908 via the network 910 to be presented to the user.

An API server 918 and a web server 920 are coupled, and provide programmatic and web interfaces respectively, to the servers 922. For example, the API server 918 and the web server 920 may produce messages (e.g., RPC calls) in response to inputs received via the network, where the messages are supplied as input messages to workflows orchestrated by the processing system 906. The API server 918 and the web server 920 may also receive return values (return messages) from the processing system 906 and return results to calling parties (e.g., web clients 902 and client applications 904 running on client devices 908 and third-party applications 914) via the network 910. The servers 922 host the processing system 906, which includes components or applications in accordance with embodiments of the present disclosure as described above. The servers 922 are, in turn, shown to be coupled to one or more database servers 924 that facilitate access to information storage repositories (e.g., databases 926). In an example embodiment, the databases 926 includes storage devices that store information accessed and generated by the processing system 906, such as software module or content item library 204, the user database 240, and the library of available layouts 250 of FIG. 2 and other databases, such as database storing information associated with particular software modules.

Additionally, a third-party application 914, executing on one or more third-party servers 921, is shown as having programmatic access to the networked system 916 via the programmatic interface provided by the API server 918. For example, the third-party application 914, using information retrieved from the networked system 916, may support one or more features or functions on a website hosted by a third party. For example, a software module available on the software platform 200 (e.g., available in the library 204 of software modules) may provide access to the third-party application 914 through an app view included in a user interface customized and generated by the processing system 906.

Turning now specifically to the applications hosted by the client device 908, the web client 902 may access the various systems (e.g., the processing system 906) via the web interface supported by the web server 920. Similarly, the client application 904 (e.g., an "app" such as a payment processor app) may access the various services and functions provided by the processing system 906 via the programmatic interface provided by the API server 918. The client application 904 may be, for example, an "app" executing on the client device 908, such as an iOS or Android OS application to enable a user to access and input data on the networked system 916 in an offline manner and to perform batch-mode communications between the client application 904 and the networked system 916.

Further, while the network architecture 900 shown in FIG. 9 employs a client-server architecture, the present disclosure is not limited to such an architecture, and could equally well find application in a distributed, or peer-to-peer, architecture system, for example.

Figure 10:
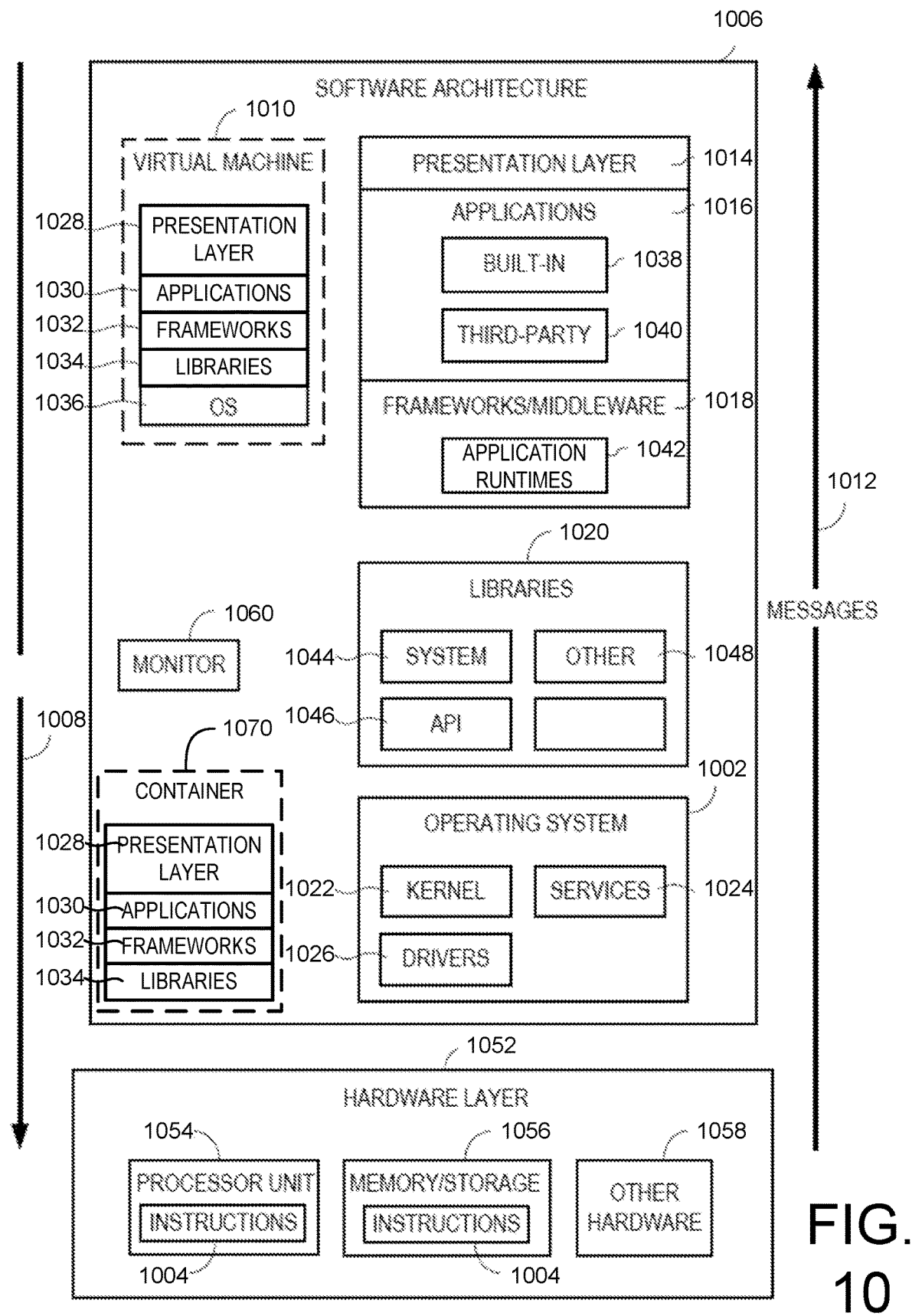
FIG. 10 is a block diagram illustrating a representative software architecture, which may be used in conjunction with various hardware architectures as described herein.

FIG. 10 is a block diagram illustrating an example software architecture 306, which may be used in conjunction with various hardware architectures herein described. FIG. 10 is a non-limiting example of a software architecture 1006, and it will be appreciated that many other architectures may be implemented to facilitate the functionality described herein. The software architecture 1006 may execute on hardware such as a machine 1000 of FIG. 10 that includes, among other things, processors 1004, memory/storage 1006, and input/output (I/O) components 1018. A representative hardware layer 1052 is illustrated and can represent, for example, the machine 1000 of FIG. 10. The representative hardware layer 1052 includes a processor 1054 having associated executable instructions 1004. The executable instructions 1004 represent the executable instructions of the software architecture 1006, including implementation of the methods, components, and so forth described herein. The hardware layer 1052 also includes non-transitory memory and/or storage modules as memory/storage 1056, which also have the executable instructions 1004. The hardware layer 1052 may also include other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016 (such as the services of the processing system), and a presentation layer 1014. Operationally, the applications 1016 and/or other components within the layers may invoke API calls 1008 through the software stack and receive a response as messages 1012 in response to the API calls 1008. The layers illustrated are representative in nature, and not all software architectures have all layers. For example, some mobile or special-purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide high-level resource management functions, web application frameworks, application runtimes 1042 (e.g., a Java virtual machine or JVM), and so forth. The frameworks/middleware 1018 may provide a broad spectrum of other APIs that may be utilized by the applications 1016 and/or other software components/modules, some of which may be specific to a particular operating system or platform.

The applications 1016 include built-in applications 1038 and/or third-party applications 1040. The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems, interactions with a user may occur through a presentation layer, such as the presentation layer 1014. In these systems, the application/component "logic" can be separated from the aspects of the application/component that interact with a user.

Some software architectures use virtual machines. In the example of FIG. 10, this is illustrated by a virtual machine 1010. The virtual machine 1010 creates a software environment where applications/components can execute as if they were executing on a hardware machine (such as the machine 1100 of FIG. 11, for example). The virtual machine 1010 is hosted by a host operating system (e.g., the operating system 1002 in FIG. 10) and typically, although not always, has a virtual machine monitor 1060 (or hypervisor), which manages the operation of the virtual machine 1010 as well as the interface with the host operating system (e.g., the operating system 1002). A software architecture executes within the virtual machine 1010 such as an operating system (OS) 1036, libraries 1034, frameworks 1032, applications 1030, and/or a presentation layer 1028. These layers of software architecture executing within the virtual machine 1010 can be the same as corresponding layers previously described or may be different.

Some software architectures use containers 1070 or containerization to isolate applications. The phrase "container image" refers to a software package (e.g., a static image) that includes configuration information for deploying an application, along with dependencies such as software components, frameworks, or libraries that are required for deploying and executing the application. As discussed herein, the term "container" refers to an instance of a container image, and an application executes within an execution environment provided by the container. Further, multiple instances of an application can be deployed from the same container image (e.g., where each application instance executes within its own container). Additionally, as referred to herein, the term "pod" refers to a set of containers that accesses shared resources (e.g., network, storage), and one or more pods can be executed by a given computing node. A container 1070 is similar to a virtual machine in that it includes a software architecture including libraries 1034, frameworks 1032, applications 1030, and/or a presentation layer 1028, but omits an operating system and, instead, communicates with the underlying host operating system 1002.

Figure 11:
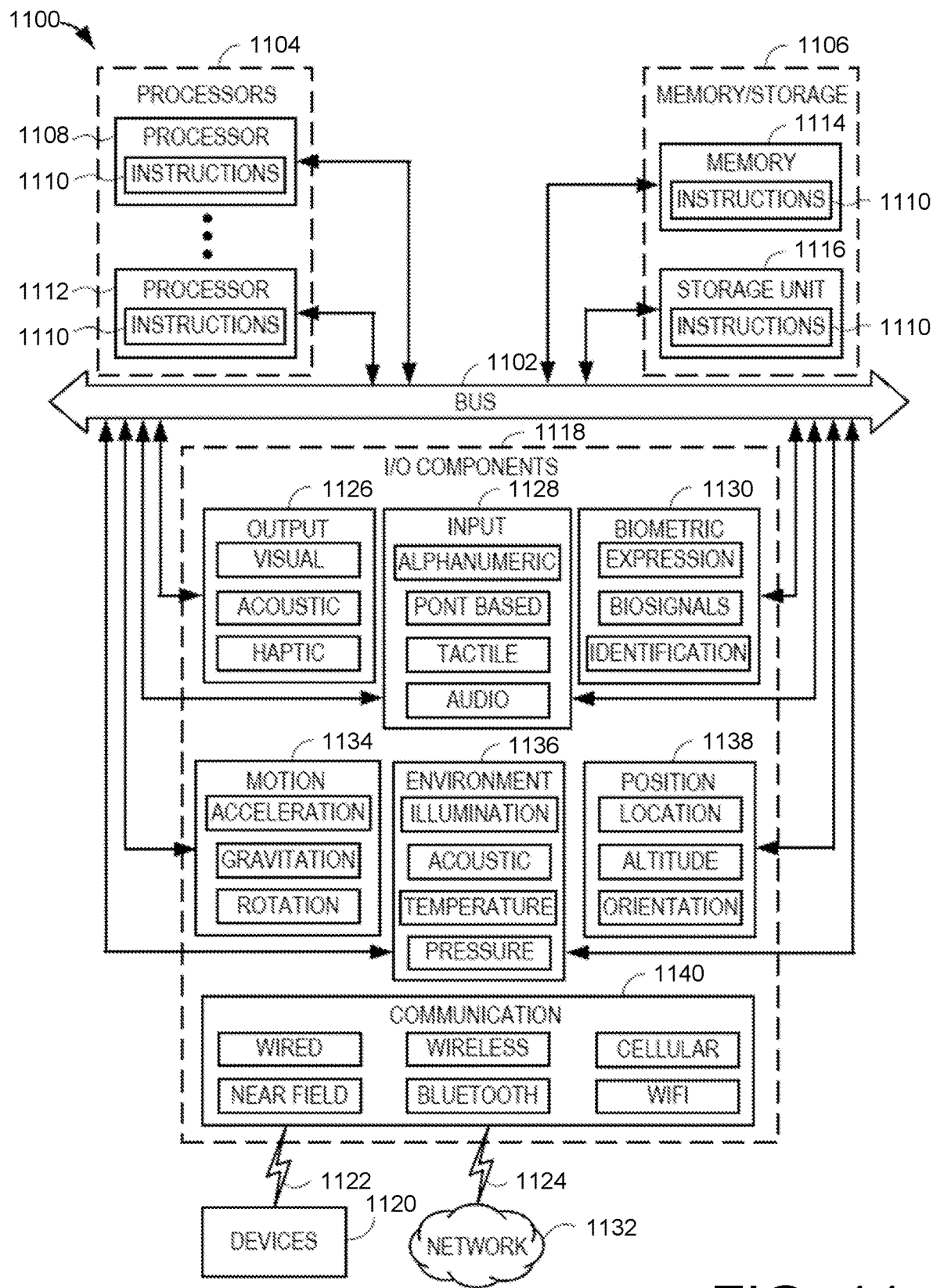
FIG. 11 is a block diagram illustrating components of a processing circuit or a processor, according to some example embodiments, configured to read instructions from a non-transitory computer-readable medium (e.g., a non-transitory machine-readable storage medium) and perform any one or more of the methods discussed herein.

FIG. 11 is a block diagram illustrating components of a machine 1100, according to some example embodiments, able to read instructions from a non-transitory machine-readable medium (e.g., a computer-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, nonprogrammed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or in parallel or concurrently, that specify actions to be taken by the machine 1100. Further, while only a single machine 1100 is illustrated, the term "machine" or "processing circuit" shall also be taken to include a collection of machines that individually or jointly execute the instructions 1110 to perform any one or more of the methodologies discussed herein.

The machine 1100 may include processors 1104 (including processors 1108 and 1112), memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of the processors 1104 are examples of machine-readable media.

The I/O components 1118 may include a wide variety of components to receive input, provide output, produce output, transmit information, exchange information, capture measurements, and so on. The specific I/O components 1118 that are included in a particular machine will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion, and the grouping is in no way limiting. In various example embodiments, the I/O components 1118 may include output components 1126 and input components 1128. The output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environment components 1136, or position components 1138, among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122, respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geo-location, location via Wi-Fi® signal triangulation, location via detecting an NFC beacon signal that may indicate a particular location, and so forth.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for generating a user interface comprising:
   receiving, by a computer system comprising a processing circuit and memory, a user request to access a software platform, the user request being associated with a user identifier;
   generating, by the computer system, a user context based on the user request, the user context comprising a user profile associated with the user identifier;
   loading, by the computer system, a data structure representing a user interface layout, the data structure comprising a plurality of viewport nodes, a first viewport node of the viewport nodes being associated with a plurality of child nodes representing options for software modules or content items to be shown in a first viewport;
   selecting, by the computer system automatically without manual intervention, a first child node from the plurality of child nodes of the first viewport node based on the user context to generate an evaluated data structure comprising a plurality of evaluated viewport nodes comprising an evaluated first viewport node associated with the first child node; and
   generating, by the computer system, a customized user interface based on the evaluated data structure, the customized user interface comprising the first viewport, the first viewport displaying a software module or a content item associated with the first child node.

2. The method of claim 1, further comprising selecting, by the computer system, the user interface layout from a plurality of user interface layouts based on the user context.

3. The method of claim 1, wherein the selecting the first child node based on the user context is performed by a trained machine learning model.

4. The method of claim 3, wherein the trained machine learning model is a reinforcement learning model.

5. The method of claim 1, wherein the plurality of child nodes are associated with a plurality of requirements, wherein the selecting the first child node based on the user context comprises:
   evaluating the plurality of requirements based on the user context to compute a plurality of eligibility evaluations of the plurality of child nodes of the first viewport node; and
   removing ineligible child nodes from the first viewport node to compute one or more eligible child nodes.

6. The method of claim 5, wherein the selecting the first child node based on the user context further comprises:
   computing one or more scores corresponding to the one or more eligible child nodes based on the user context; and
   computing a selected child node as the first child node based on the one or more scores.

7. The method of claim 5, wherein the selecting the first child node based on the user context further comprises:
   computing a selected child node as the first child node based the user context using a trained machine learning model associated with the one or more eligible child nodes.

8. The method of claim 1, wherein each of the evaluated viewport nodes has at most one child node, and
   wherein the generating the customized user interface based on the evaluated data structure comprises rendering the at most one child node of each of the evaluated viewport nodes of the evaluated data structure.

9. The method of claim 8, wherein the rendering the at most one child node comprises generating a hypertext markup language representation of the at most one child node of each of the plurality of evaluated viewport nodes of the evaluated data structure.

10. The method of claim 1, further comprising:
    detecting an error raised by a selected child node of the first viewport node;
    marking the selected child node as ineligible; and
    evaluating the first viewport node to select a child node other than the selected child node as the first child node.

11. A system comprising:
    a processing circuit; and
    memory storing instructions that, when executed by the processing circuit, cause the processing circuit to:
      receive a user request to access a software platform, the user request being associated with a user identifier;
      generate a user context based on the user request, the user context comprising a user profile associated with the user identifier;
      load a data structure representing a user interface layout, the data structure comprising a plurality of viewport nodes, a first viewport node of the viewport nodes being associated with a plurality of child nodes representing options for software modules or content items to be shown in a first viewport;
      select, automatically without manual intervention, a first child node from the plurality of child nodes of the first viewport node based on the user context to generate an evaluated data structure comprising a plurality of evaluated viewport nodes comprising an evaluated first viewport node associated with the first child node; and
      generate a customized user interface based on the evaluated data structure, the customized user interface comprising the first viewport, the first viewport displaying a software module or a content item associated with the first child node.

12. The system of claim 11, wherein the memory further stores instructions that, when executed by the processing circuit, cause the processing circuit to select the user interface layout from a plurality of user interface layouts based on the user context.

13. The system of claim 11, wherein the memory further stores instructions that, when executed by the processing circuit, cause the processing circuit to select the first child node based on the user context is performed by a trained machine learning model.

14. The system of claim 13, wherein the trained machine learning model is a reinforcement learning model.

15. The system of claim 11, wherein the plurality of child nodes are associated with a plurality of requirements,
wherein the memory further stores instructions that, when executed by the processing circuit, cause the processing circuit to select the first child node based on the user context by:
evaluating the plurality of requirements based on the user context to compute a plurality of eligibility evaluations of the plurality of child nodes of the first viewport node; and
removing ineligible child nodes from the first viewport node to compute one or more eligible child nodes.

16. The system of claim 15, wherein the memory further stores instructions that, when executed by the processing circuit, cause the processing circuit to select the first child node based on the user context by:
computing one or more scores corresponding to the one or more eligible child nodes based on the user context; and
computing a selected child node as the first child node based on the one or more scores.

17. The system of claim 15, wherein the memory further stores instructions that, when executed by the processing circuit, cause the processing circuit to select the first child node based on the user context by:
computing a selected child node as the first child node based the user context using a trained machine learning model associated with the one or more eligible child nodes.

18. The system of claim 11, wherein each of the evaluated viewport nodes has at most one child node, and
wherein the memory further stores instructions that, when executed by the processing circuit, cause the processing circuit to generate the customized user interface based on the evaluated data structure comprises rendering the at most one child node of each of the evaluated viewport nodes of the evaluated data structure.

19. The system of claim 18, wherein the memory further stores instructions that, when executed by the processing circuit, cause the processing circuit to render the at most one child node by generating a hypertext markup language representation of the at most one child node of each of the plurality of evaluated viewport nodes of the evaluated data structure.

20. The system of claim 11, the memory further stores instructions that, when executed by the processing circuit, cause the processing circuit to:
detect an error raised by a selected child node of the first viewport node;
mark the selected child node as ineligible; and
evaluate the first viewport node to select a child node other than the selected child node as the first child node.

* * * * *